United States Patent
Vandikas et al.

(10) Patent No.: US 11,411,834 B2
(45) Date of Patent: Aug. 9, 2022

(54) METHOD, CONTROL UNIT AND NETWORK NODE FOR CONFIGURATION IN A WIRELESS COMMUNICATION SYSTEM

(71) Applicant: Telefonaktiebolaget LM Ericsson (publ), Stockholm (SE)

(72) Inventors: Konstantinos Vandikas, Solna (SE); Abdulrahman Alabbasi, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/435,183

(22) PCT Filed: Mar. 7, 2019

(86) PCT No.: PCT/EP2019/055757
§ 371 (c)(1),
(2) Date: Aug. 31, 2021

(87) PCT Pub. No.: WO2020/177869
PCT Pub. Date: Sep. 10, 2020

(65) Prior Publication Data
US 2022/0150131 A1  May 12, 2022

(51) Int. Cl.
*G06F 15/16* (2006.01)
*G06F 15/173* (2006.01)
(Continued)

(52) U.S. Cl.
CPC ............ *H04L 41/147* (2013.01); *H04L 41/16* (2013.01); *H04L 67/61* (2022.05)

(58) Field of Classification Search
CPC ...... H04L 41/147; H04L 41/16; H04L 67/322
(Continued)

(56) References Cited

U.S. PATENT DOCUMENTS 9,430,280 B1 * 8/2016 Shih .................. G06F 9/5005
10,270,644 B1 * 4/2019 Valsecchi ............ H04L 41/5074
(Continued)

FOREIGN PATENT DOCUMENTS

CN        103401929 A     11/2013
WO   WO 2019/025944 A1    2/2019

OTHER PUBLICATIONS

International Search Report and Written Opinion of the International Searching Authority, PCT/EP2019/055757, dated Nov. 11, 2019, 11 pages.
(Continued)

*Primary Examiner* — Karen C Tang
(74) *Attorney, Agent, or Firm* — Sage Patent Group

(57) ABSTRACT

A method in a control unit for configuration in a wireless communication system is provided. A service category is mapped to a virtual network instance based on service requirements of the service category, the virtual network instance having a first virtual network instance configuration for a current time interval, the first virtual network instance configuration defining a first allocation of resources in a plurality of network layers. A network state in a next time interval is predicted and it is determined if the predicted network state results in a predicted performance degradation in the next time interval. On condition that there is a predicted performance degradation, a second virtual network instance configuration is determined for the next time interval. The virtual network instance is configured based on the first network instance configuration or the second network instance configuration.

18 Claims, 3 Drawing Sheets

(51) Int. Cl.
    *H04L 41/147*     (2022.01)
    *H04L 67/61*     (2022.01)
    *H04L 41/16*     (2022.01)

(58) Field of Classification Search
    USPC .......................................................... 709/224
    See application file for complete search history.

(56) References Cited

U.S. PATENT DOCUMENTS

| | | |
|---|---|---|
| 2008/0086731 A1 | 4/2008 | Trossman et al. |
| 2008/0134194 A1 | 6/2008 | Liu |
| 2016/0373941 A1 | 12/2016 | Daijavad et al. |
| 2018/0203739 A1* | 7/2018 | Brady .................. G06F 9/5077 |
| 2019/0159048 A1* | 5/2019 | Feldkamp ............. H04W 24/02 |
| 2019/0318026 A1* | 10/2019 | Joseph .................. G06F 11/324 |
| 2019/0363950 A1* | 11/2019 | Li ........................... H04L 41/16 |
| 2019/0384790 A1* | 12/2019 | Bequet ............. G06F 16/90344 |
| 2020/0042212 A1* | 2/2020 | Sokolovski ......... G06F 11/3409 |
| 2020/0076520 A1* | 3/2020 | Jana .................... H04B 17/327 |
| 2020/0252271 A1* | 8/2020 | Elliott, IV ............ H04L 67/322 |
| 2021/0160147 A1* | 5/2021 | Chou .................. H04L 41/5025 |

OTHER PUBLICATIONS

ETSI TR XXX v<0.01> (<Jan. 2018>) Draft Technical Specification, Network Technologies (NTECH); Autonomic network engineering for the self-managing Future Internet (AFI); Impact of Generic Autonomic Network Architecture (GANA) on other paradigms: How GANA integrates with SDN, NFV, E2E Service Orchestration and Big-Data Analytics for Autonomies, 30 pages.

\* cited by examiner

METHOD, CONTROL UNIT AND NETWORK NODE FOR CONFIGURATION IN A WIRELESS COMMUNICATION SYSTEM

CROSS REFERENCE TO RELATED APPLICATIONS

This application is a 35 U.S.C. § 371 national stage application of PCT International Application No. PCT/EP2019/055757 filed on Mar. 7, 2019, the disclosure and content of which is incorporated by reference herein in its entirety.

TECHNICAL FIELD

The present disclosure pertains to the field of wireless communication systems. More particularly, the present disclosure pertains to a control unit, a network node and a method for configuration in a wireless communication system.

BACKGROUND

Introduction in wireless communication systems of virtual networks and virtual network instances, such as introduction of network slices and network slice instances in 3GPP 5th generation mobile communication technologies, presents possibilities to handle resource allocation by mapping services or service categories to different virtual network instances. Specific requirements for a service or service category can be met by using a specific virtual network instance having a specific resource allocation. Configuration in a wireless communication can then be performed dynamically such as by allocation of resources in terms of creation of and termination of virtual network instances. Such dynamic allocation may for example be performed in relation to a current network state, such as a current number of requests of a service or service category.

In relation to such configuration, delays and inconsistencies may arise, for example due to time required for creation of virtual network instances and due to resources for creation of a virtual network instance not being currently available.

SUMMARY

An object of the present disclosure is to provide a method, a control unit and network node which seek to mitigate, alleviate, or eliminate one or more of the above-identified deficiencies in the art and disadvantages singly or in any combination.

This object is obtained by a method in a control unit, a control unit and a network node for configuration in a wireless communication system.

According to a first aspect, a method in a control unit for configuration in a wireless communication system is provided. The method comprises mapping a service category to a virtual network instance based on service requirements of the service category, the virtual network instance having a first virtual network instance configuration for a current time interval, the first virtual network instance configuration defining a first allocation of resources in a plurality of network layers. A network state in a next time interval is predicted and it is determined if the predicted network state in the next time interval results in a predicted performance degradation in the next time interval in relation to at least one network layer of the plurality of network layers. On condition that there is a predicted performance degradation in the next time interval in relation to at least one network layer of the plurality of network layers, a second virtual network instance configuration is determined for the next time interval. The second virtual network instance configuration defines an adapted second allocation of resources in the plurality of network layers at least partly compensating for the predicted performance degradation in the next time interval in relation to the at least one network layer of the plurality of network layers. The virtual network instance is configured based on the first network instance configuration or the second network instance configuration for the next time interval.

In embodiments, the virtual network instance is configured based on the second network instance configuration for the next time interval on condition that there is a predicted performance degradation in the next time interval in relation to at least one network layer of the plurality of network layers.

In embodiments, the first network instance configuration is maintained for the virtual network instance for the next time interval on condition that there is no predicted performance degradation in the next time interval in relation to at least one network layer of the plurality of network layers.

In embodiments, predicting a network state comprises predicting a number of requests of the service category in the next time interval.

In embodiments, predicting a network states comprises predicting a channel condition in the next time interval.

In embodiments, the virtual network instance, is a network slice instance, NSI.

In embodiments, the plurality of network layers comprises a radio layer, cloud layers, and transport layers.

In embodiments, predicting a network state is performed using a machine learning, ML, algorithm.

In embodiments, the predicted performance degradation is in relation to a performance indicator of the service category.

In embodiments, the predicted performance degradation is in relation to one of peak data rate, average data rate, peak spectral efficiency, average spectral efficiency, control plane latency, user plane latency, interrupt at handover, reliability, connection density, mobility, maximum number of digital units needed for a request of the service category, transport layer consumed capacity per request of the service category, and energy of a request of the service category.

In embodiments, the method further comprising determining an actual network state in the next time interval. The determined actual network state in the next time interval and the predicted network state for the next time interval are compared. On condition that the actual network state in the next time interval differs from the predicted network state in the next time interval, prediction errors are compensated.

In embodiments, determining a second virtual network instance configuration comprises allocating, based on the predicted performance degradation in relation to the at least one network layer of the plurality of network layers, additional resources in a different network layer of the plurality of network layers than the at least one network layer of the plurality of network layers, at least partly compensating for the predicted performance degradation in the next time interval in the at least one network layer of the plurality of network layers.

According to a second aspect, a control unit for configuration in a wireless communication system is provided. The control unit comprises processing circuitry, and a memory. The memory contains instructions executable by the processing circuitry, whereby the control unit is operative to map a service category to a virtual network instance based on service requirements of the service category, the virtual network instance having a first virtual network instance configuration for a current time interval, the first virtual network instance configuration defining a first allocation of resources in a plurality of network layers. The control unit is further operative to predict a network state in a next time interval and determine if the predicted network state in the next time interval results in a predicted performance degradation in the next time interval in relation to at least one network layer of the plurality of network layers. The control unit is further operative to, on condition that there is a predicted performance degradation in the next time interval in relation to at least one network layer of the plurality of network layers, determine a second virtual network instance configuration for the next time interval, the second virtual network instance configuration defining an adapted second allocation of resources in the plurality of network layers at least partly compensating for the predicted performance degradation in the next time interval in relation to the at least one network layer of the plurality of network layers. The control unit is further operative to configure the virtual network instance based on the first network instance configuration or the second network instance configuration for the next time interval.

In embodiments, the control unit is further operative to, on condition that there is a predicted performance degradation in the next time interval in relation to at least one network layer of the plurality of network layers, configure the virtual network instance based on the second network instance configuration for the next time interval.

In embodiments, the control unit is further operative to, on condition that there is no predicted performance degradation in the next time interval of in relation to at least one network layer of the plurality of network layers, maintain the first network instance configuration for the virtual network instance for the next time interval.

In embodiments, the control unit is further operative to predict a number of requests of the service category in the next time interval.

In embodiments, the control unit is further operative to predict a channel condition in the next time interval.

In embodiments the virtual network instance, is a network slice instance, NSI.

In the plurality of network layers comprises a radio layer, cloud layers, and transport layers.

In embodiments, the control unit is further operative to predict a network state in a next time interval using a machine learning, ML, algorithm.

In embodiments, the predicted performance degradation is in relation to a performance indicator of the service category.

In embodiments, the predicted performance degradation is in relation to one of peak data rate, average data rate, peak spectral efficiency, average spectral efficiency, control plane latency, user plane latency, interrupt at handover, reliability, connection density, mobility, maximum number of digital units needed for a request of the service category, transport layer consumed capacity per request of the service category, and energy of a request of the service category.

In embodiments, the control unit is further operative to determine an actual network state in the next time interval and compare the determined actual network state in the next time interval and the predicted network state for the next time interval. The control unit is further operative to, on condition that the actual network state in the next time interval differs from the predicted network state in the next time interval, compensate for prediction errors.

In embodiments, the control unit is further operative to allocate, based on the predicted performance degradation in relation to the at least one network layer of the plurality of network layers, additional resources in a different network layer of the plurality of network layers than the at least one network layer of the plurality of network layers, at least partly compensating for the predicted performance degradation in the next time interval in the at least one network layer of the plurality of network layers.

According to a third aspect, a network node is provided for configuration in a wireless communication system, comprising a control unit of the second aspect.

In embodiments, the network node comprises embodiments of the control unit of the second aspect.

According to a fourth aspect, a computer program is provided, comprising instructions which, when executed by processing circuitry, cause the processing circuitry to perform the methods as outlined above.

According to a fifth aspect, a computer program product is provided having stored thereon a computer program comprising instructions which, when executed by processing circuitry, cause the processing circuitry to perform the methods as outlined above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
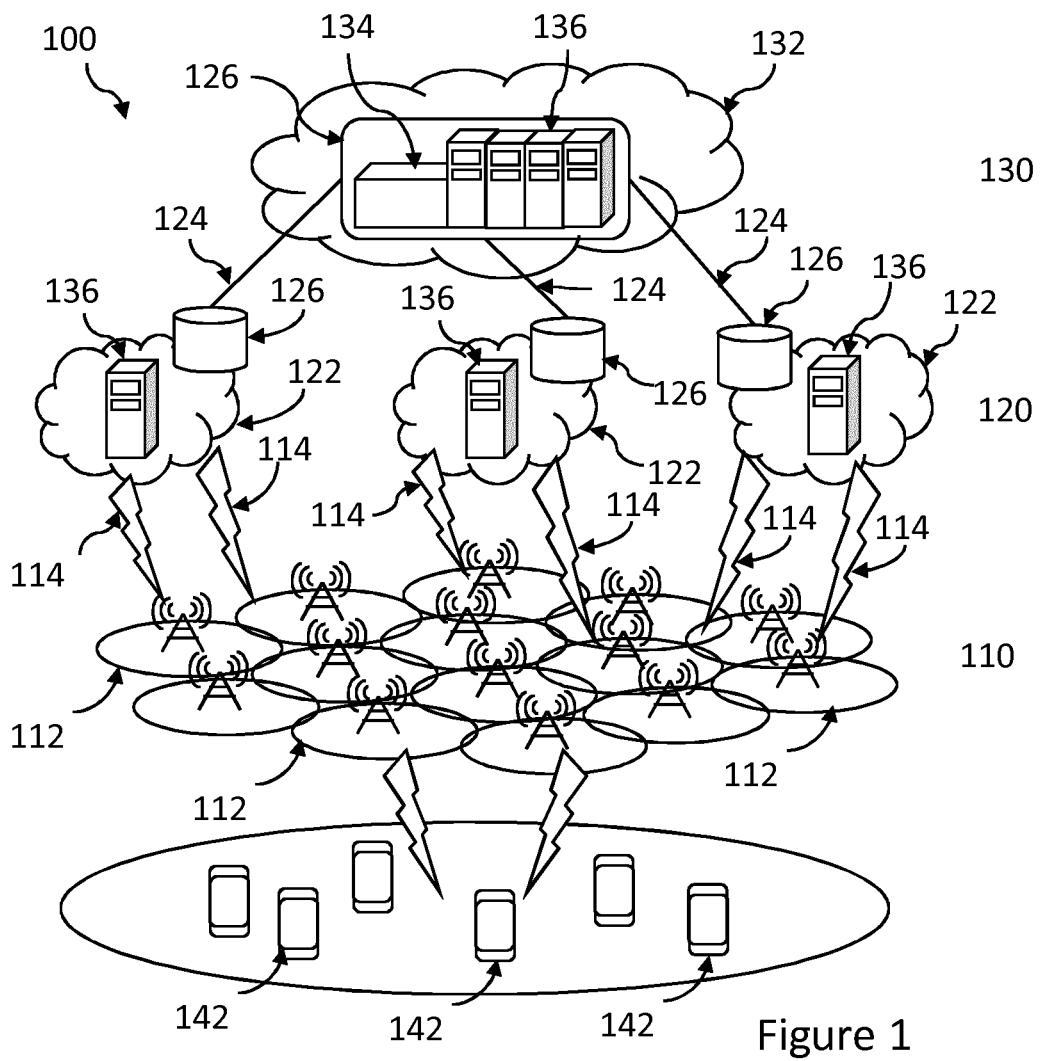
FIG. 1 is a schematic view of a network layer structure in relation to which embodiments of the present disclosure may be practiced.

Aspects of the present disclosure will be described more fully hereinafter with reference to the accompanying drawings. The control unit and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards configuration in a wireless communication system. As part of the development of the example embodiments presented herein, a problem will first be identified and discussed.

Introduction in wireless communication systems of virtual networks and virtual network instances, such as introduction of network slices and network slice instances in 3GPP 5th generation mobile communication technologies, presents possibilities to handle resource allocation by mapping services or service categories to different virtual network instances. Specific requirements for a service or service category can be met by using a specific virtual network instance having a specific resource allocation. Configuration in a wireless communication can then be performed dynamically such as by allocation of resources in terms of creation of and termination of virtual network instances. Such dynamic allocation may for example be performed in relation to a current network state, such as a current number of requests of a service or service category.

In relation to such configuration delays and inconsistencies may arise, for example due to time required for creation of virtual network instances and due to resources for creation of a virtual network instance not being currently available.

Consequently, initial access delay of each software module (also known as a virtual network function) to be allocated in a network slice can reach up to hundreds of milli-seconds, seconds or minutes depending on the load of the cluster where these modules are going to be deployed.

FIG. 1 is a schematic view of a network layer structure 100 in relation to which embodiments of the present disclosure may be practiced. FIG. 1 shows a hybrid architecture of a cloud radio access network (CRAN). The CRAN of FIG. 1 is a three-layer architecture, which consists of cell layer 110, edge cloud layer 120, and central cloud layer 130. Cell layer consists of cells 112, each serving several user equipments (UEs) 142. The coverage of a radio unit (RU) is referred to as a 'cell' 112. A group of cells 112 are connected to an edge cloud 122 as an aggregation point. The fronthaul connections 114 between the cells 112 and the edge clouds 122 may be implemented using short point-to-point m-Wave links. The midhaul connections 124 between the edge clouds 122 and the central cloud 132 may be implemented using various technologies, such as dark fibre solutions, passive optical network (PON) families or other Ethernet-based technologies. Switches 126 at the edge clouds 122 and the central cloud 132 may be optical switches, and in case of not using m-Wave for fronthaul links, there may also be optical switches in the cells 112. A switch 134 at the central cloud may be an Ethernet switch. Edge cloud layer 120 and central cloud layer 130 contain digital units (DUs) 136. These DUs 136 are able to accommodate and process virtualized functions of the requested contents and network processes. Hence, the DUs 136 are capable of sharing their computational resources by any connected radio units RUs in the cells 112 (if implemented in general purpose servers). For example, in upstream, traffic from cells 112 can be partially processed at edge cloud 122 so that bandwidth requirement can be relaxed for midhaul, then remaining processing will be conducted at central cloud 132. However, edge cloud 122 is usually less energy efficient than central cloud 132, because the number of DUs 136, associated with RUs of the cells 112, at the central cloud 132 is larger than that in each edge cloud 122. Hence, sharing infrastructure equipment results in higher energy saving at central cloud. Hence, one trade-off may be whether to distribute communication function processing at the edge clouds 122 (to save midhaul bandwidth and improve the delay), or to centralize more functions to the central cloud 132 (to save energy).

It is to be noted that the architecture illustrated in FIG. 1 is only an example. Embodiments of the disclosure can be implemented in other types of architectures having a layered structure with a plurality of network layers, where allocation of resources can be adapted in the plurality of network layers to at least partly compensate for a performance degradation in relation to at least one network layer of the plurality of network layers.

Figure 2:
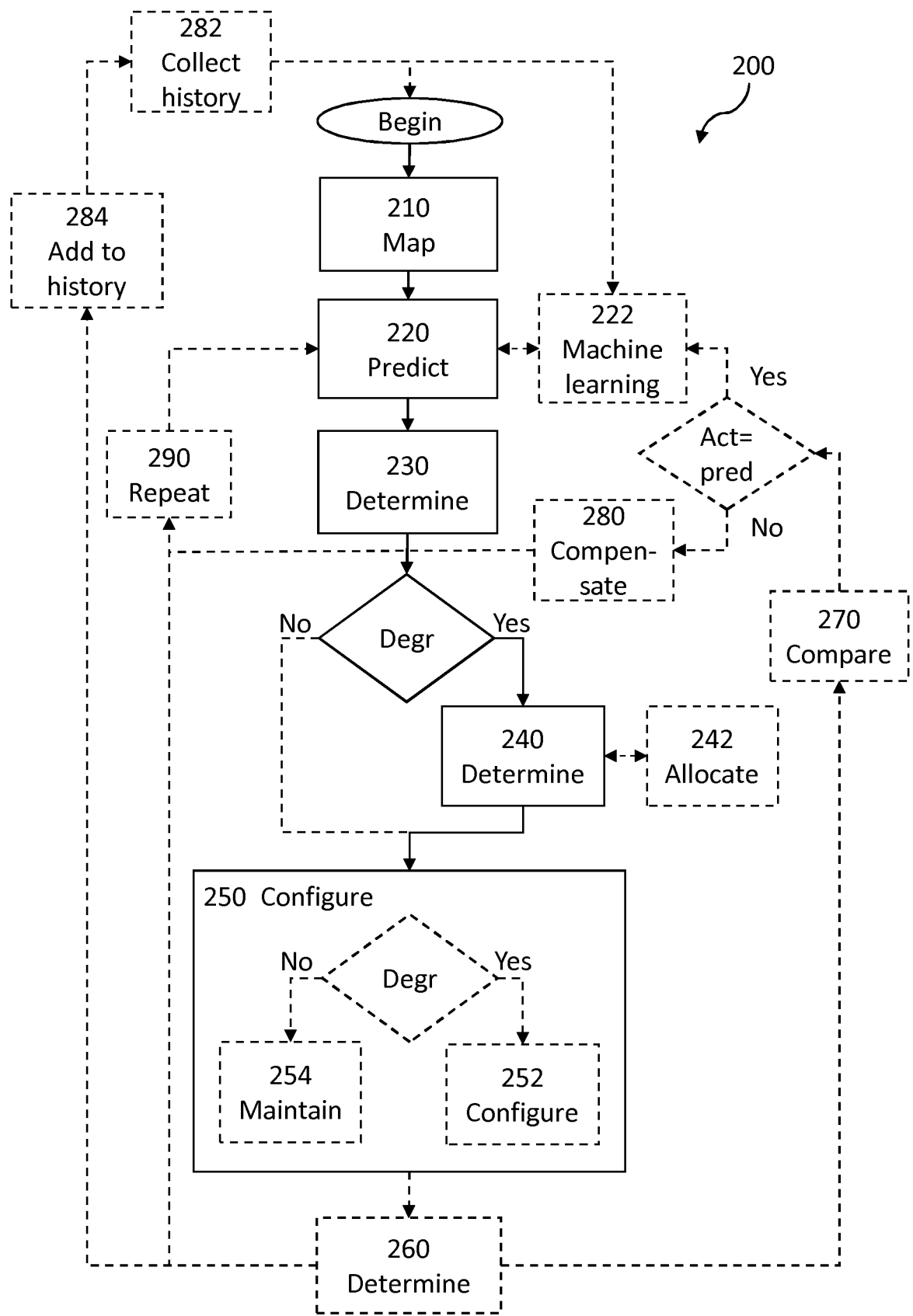
FIG. 2 is a flowchart illustrating embodiments of a method performed by a control unit for configuration in a wireless communication system.

FIG. 2 is a flowchart illustrating embodiments of a method 200 in a control unit for configuration in a wireless communication system. The communication system has a network architecture including a layered structure, for example according to the layered structured illustrated in FIG. 1. Virtual network instances, for example in the form of network slice instances, are created, configured, re-configured and terminated using a virtual network management function, such as a network slice management function, in relation to a network state. For example, the network state may indicate a number of requests for a service category and the service category may be mapped to a virtual network instance.

Figure 5:
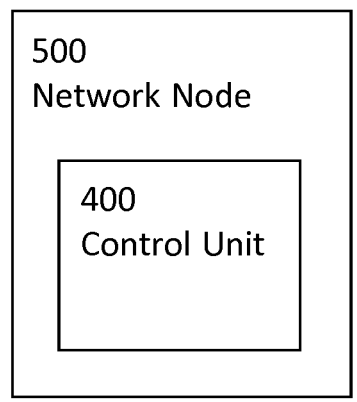
FIG. 5 is a block diagram illustrating embodiments of a network node.
Figure 4:
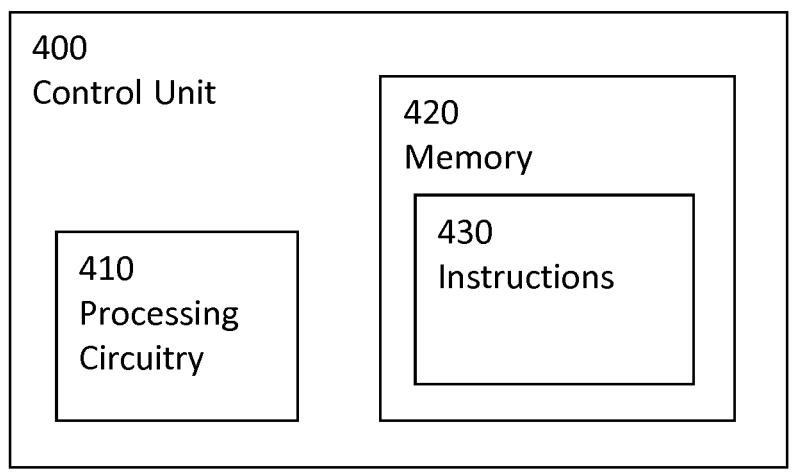
FIG. 4 is a block diagram illustrating embodiments of a control unit.

The control unit in which the method is performed may be an embodiment of a control unit 400 illustrated in FIG. 4 and may be included in an embodiment of a network node 500 illustrated in FIG. 5.

An embodiment of the method 200 illustrated in FIG. 2 comprises mapping 210 a service category to a virtual network instance based on service requirements of the service category. The service category may for example be one of the service types enhanced mobile broadband (eMBB), ultra-reliable low latency communications (URLLC), and massive IoT (mMTC). The virtual network instance has a first virtual network instance configuration for a current time interval. The first virtual network instance configuration defines a first allocation of resources in a plurality of network layers, such as the network layers 110, 120, 130 in FIG. 1. The resources allocated in the different network layers of the plurality of network layers will depend on the network layer. In some embodiments, a virtual network instance, is a network slice instance, NSI. In embodiments, the plurality of network layers comprises a radio layer, cloud layers, and transport layers.

Allocation of resources in the plurality of network layers comprises also allocation of resources in connections 114, 126 between network components in the plurality of network layers 110, 120, 130.

In a further step of the embodiment, a network state in a next time interval is predicted 220. The prediction may be performed in any suitable way.

By predicting a network state in a next time interval, it will be possible to start the allocation of resources for the next time interval before the next time interval has started. Hence, delays due to allocation can be reduced.

In some embodiments, the prediction is performed 222 using a machine learning, ML, algorithm. The network state may specify dynamic properties that are relevant to virtual network instance configuration.

In some embodiments predicting 220 comprises predicting a number of requests of the service category in the next time interval.

In some embodiments, predicting 220 a network states comprises predicting a channel condition in the next time interval.

In a further step of the embodiment, determining 230 if the predicted network state in the next time interval results in a predicted performance degradation in the next time interval in relation to at least one network layer of the plurality of network layers.

In some embodiments, the predicted performance degradation is in relation to a performance indicator of the service category. For example, the performance indicator may relate to a performance parameter for which there are specific requirements for the service category.

In some embodiments, the predicted performance degradation is in relation to one of peak data rate, average data rate, peak spectral efficiency, average spectral efficiency, control plane latency, user plane latency, interrupt at handover, reliability, connection density, mobility, maximum number of digital units needed for requests of the service category, transport layer consumed capacity per service category, and energy of requests of the service category.

In a further step of the embodiment, a second virtual network instance configuration for the next time interval is determined 240. The determining 240 of the second virtual network instance configuration is performed on condition that there is a predicted performance degradation in the next time interval in relation to at least one network layer of the plurality of network layers. The second virtual network instance configuration defines an adapted second allocation of resources in the plurality of network layers. The adapted second allocation of resources at least partly compensates for the predicted performance degradation in the next time interval in relation to the at least one network layer of the plurality of network layers.

A second virtual network instance configuration for the next time interval defining an adapted second allocation of resources may include creating further virtual network instances and/or changing the allocation of resources in the plurality of network layers for existing virtual network instances.

By determining an adapted second allocation of resources which at least partly compensates for the predicted performance degradation in the next time interval in relation to the at least one network layer of the plurality of network layers predicting a network state in a next time interval, it will at least in some instances be possible to allocate adequate resources to avoid performance degradation. Hence, at least in some instances, this can make it possible to avoid the need to create further virtual network instances which can reduce delay.

Furthermore, in combination with prediction of a network state, it will be possible to start the determining of an adapted second allocation of resources for the next time interval before the next time interval has started. Hence, delays can be further reduced.

In embodiments, determining 240 a second virtual network instance configuration comprises allocating 242, based on the predicted performance degradation in relation to the at least one network layer of the plurality of network layers, additional resources in a different network layer of the plurality of network layers than the at least one network layer of the plurality of network layers. Allocating 242 additional resources at least partly compensates for the predicted performance degradation in the next time interval in the at least one network layer of the plurality of network layers.

In a further step of the embodiment, the virtual network instance is configured 250 based on the first network instance configuration or the second network instance configuration for the next time interval.

In some embodiments, configuring 250 the virtual network instance comprises configuring 252 the virtual network instance based on the second network instance configuration for the next time interval on condition that there is a predicted performance degradation in the next time interval in relation to at least one network layer of the plurality of network layers.

In some embodiments, configuring 250 the virtual network instance further comprises maintaining 254 the first network instance configuration for the virtual network instance for the next time interval on condition that there is no predicted performance degradation in the next time interval in relation to at least one network layer of the plurality of network layers.

In some embodiments further steps are performed. More specifically, an actual network state in the next time interval is determined 260. The actual network state may be determined 260 by measuring particular dynamic properties of the network during the next time interval, such as at least one of measuring a number of requests of a service category and measuring a channel status. The determined actual network state in the next time interval and the predicted network state for the next time interval are compared 270. On condition that the actual network state in the next time interval differs from the predicted network state in the next time interval, compensating 280 for prediction errors is performed. For example, if the actual network state shows that a number of requests of the service category in the next time interval is higher than predicted, more resources may be allocated to compensate 280 for the prediction error. On the other hand, if the actual network state shows that a number of requests of the service category in the next time interval is lower than predicted, some resources may be released to compensate 280 for the prediction error.

When the virtual network instance has been configured 250 based on the first network instance configuration or the second network instance configuration for the next time interval and optionally an actual network state has been determined 260, the procedure may be repeated 290 starting with a new prediction 220 of a network state for a new time interval following the now predicted next time interval.

For embodiments using machine learning 222 for prediction the machine learning algorithm may be based on collected history 282 indicating values of selected input parameters for a current time interval and a determined 260 actual network state in a next time interval. For each time the procedure is repeated 290, the determined actual state and values of selected input parameters are added 284 to history.

In some embodiments of a method 200 for configuration in a wireless communication as illustrated in FIG. 2, prediction 220 of a network state in a next time period comprises prediction of a number of requests for a service category for the next time period, such as for the next y seconds.

There are different ways of solving this problem but in a case where constant time performance is of interest, an example embodiment using machine learning 222 by means of a neural network can be used. An example of such an embodiment will be described in the following without loss of generality of type of method possible to use for prediction. For reference, an alternative approach would be to use a moving average window based on requests made for the service category historically. Such an alternative solution would at least work if the dataset is deprived of enough outliers. However, it may to some extent be limited since it will not take into consideration other aspects that would, at least for some situations, achieve more accurate predictions.

In the example embodiment using machine learning 222 by means of a neural network, a linear regression neural network is built specifically trained for the service category. Similar neural networks may be built specifically trained for each service category of a set of service categories. The neural networks would then share the same structure but they will be trained on different datasets which will be specific to each service category.

A structure of the model is as follows. A first layer contains as many neurons as the input parameters we are interested in. As an example, the following (9 input parameters) may be considered:
1. Service categories and corresponding required delay
2. Priority of each service category among the set of service categories
3. Time, e.g. in second, minutes, hours, and day
4. Events in relevant location and time (e.g. sport event, concert etc.)
5. Channel status information per UE (e.g., amplitudes, channel delay spread, channel phase, etc.)
6. Location of cells
7. Environmental elements (e.g. season, natural events, humidity, earthquakes, buildings structure and materials etc.)
8. Bandwidth available per cell per UE
9. Base station maintenance condition (e.g. latest maintenance data, age of site, and technology)

As an example algorithm for predicting requests the following steps may be performed:
  Obtain log (preferably large) of datasets that classify the traffic demand for the service category. Datasets include for example bits per second, signal strength, radio channel information, service requirements (bandwidth, processing cycles, etc.).
  Identify the associated location (remote RU, gNB-DU).
  Extract and remove the unusual data from the raw dataset.
  Apply sliding window moving average on the service category dataset. This reduces the high fluctuation in the data, e.g. to reduce unnecessary creation of virtual network instances.
  Decide input and output parameters. For example input parameters may be time series, events in the neighbourhood, current measurements of traffic, cell characteristics, antenna number, power consumption, maintenance needs of a site and neighbour sites. See further above. Output parameters may for example be predicted traffic and bits per second for the service category in all sites.
  Decide on the training, validation and testing number of requests.
  Decide and apply the training and prediction too. For this purpose, Levenberg-Marquardt optimization may be used to train the neural network agent and later predict the future data.
  Convert the predicted output to number of requests for the service category For a set of service categories, the algorithm would be performed using a set of neural networks which share the same structure but each service category is trained on a different dataset which is specific to the service category.

In some embodiments of a method 200 for configuration in a wireless communication as illustrated in FIG. 2, prediction 220 of a network state in a next time period comprises prediction of a channel condition of a channel for the next time period, such as for the next y seconds, and used to anticipate a performance degradation. A linear regression neural network is built specifically trained for the channel. Similar neural networks may be built specifically trained for each of a set of channels. The neural networks would then share the same structure but they will be trained on different datasets which will be specific to each channel.

A structure of the model is as follows. A first layer contains as many neurons as the input parameters we are interested in. As an example, the following (x parameters) may be considered:
1. Time stamp
2. Radio sub-frame size
3. UE mobility
4. UE position
5. Environment and surrounding building
6. Number of antenna
7. Multiple connectivity.

The channel condition prediction can be combined with the prediction of number of request of a service category. Such a combination is used to determine if there is a predicted performance degradation.

In some embodiments of a method 200 for configuration in a wireless communication as illustrated in FIG. 2, prediction 220 of a network state in a next time period comprises prediction of a number of requests for a service category for the next time period, such as for the next y seconds.

Based on the predicted number of requests for the service category and a current allocation of resources in the plurality of network layers it is determined 230 if the predicted network state in the next time interval results in a predicted performance degradation in the next time interval in relation to at least one network layer of the plurality of network layers. The performance degradation may for example be in relation to a performance indicator of the service category. For example, the performance indicator may relate to a performance parameter for which there are specific requirements for the service category. Specifically, the predicted performance degradation is in relation to one of peak data rate, average data rate, peak spectral efficiency, average spectral efficiency, control plane latency, user plane latency, interrupt at handover, reliability, connection density, mobility, maximum number of digital units needed for requests of the service category, transport layer consumed capacity per service category, and energy of requests of the service category.

If there is a predicted performance degradation in the next time interval in relation to at least one network layer of the plurality of network layers, a second virtual network instance configuration for the next time interval is determined 240. The second virtual network instance configuration defines an adapted second allocation of resources in the plurality of network layers. The adapted second allocation of resources at least partly compensates for the predicted performance degradation in the next time interval in relation to the at least one network layer of the plurality of network layers. The compensation may comprise allocating 242 additional resources in a different network layer of the plurality of network layers than the at least one network layer of the plurality of network layers for which predicted performance degradation has been determined. Allocating 242 additional resources at least partly compensates for the predicted performance degradation in the next time interval in the at least one network layer of the plurality of network layers. Determining 240 a second virtual network instance configuration defining an adapted second allocation of resources in the plurality of network layers may comprise re-configuring virtual network instances, such as network slice instances. Such a re-configuration may comprise:
  Changing UE radio parameters such as modulation index (MI), transmission (Tx) power, physical resource blocks (PRB), radio access technology (RAT).

Changing allocation of number of virtual central processing units (vCPUs) per virtual network instance.

Changing priority of accessing transport network for each virtual network instance.

Changing encryption technique.

In a further example embodiment of a method illustrated in FIG. 2, determining 230 of a performance degradation is made in relation to user plane latency and energy of request of the service category. A model that acts as orchestration scheme for all network parameters, i.e. radio access network (RAN) parameters (e.g., modulation and coding scheme (MCS), PRB, number of radio-subframes, etc.), cloud processing & transporting parameters (e.g. number of vCPUs, location of processing, number of optical frames, etc.), and a targeted key performance indicator (KPI) for the service category in relation to the user plane latency and energy of request of the service category. Equation 1 provides a metric for the energy per requested service category. Description of the symbols of the following equations are found in Table 1.

$$\mathcal{E}_{US}(z) = [(E_{lc} + E_{es})V_{S_u} + E_{du}^{cc} C_u^{cc,z}] \frac{1}{Ef_{cc}} +$$

$$[(E_{onu} + E_{osw})V_{S_u} + E_{du}^{cc} C_u^{ec,z} \eta_{pw}^{ec} + E_{mWT} V_{S_u=9}] \frac{1}{Ef_{ec}} +$$

$$\left[ P_{Ang} N_{rsf} T_{rsf} \frac{R_u}{R_T} + \Pi(z = DL) \rho_{Tx} R_u N_{rsf} + \right.$$

$$\left. E_{mWR} V_{S_u=9} \right] \frac{1}{Ef_{ru}} +$$

$$P_{Ang}^{(UE)} N_{rsf} T_{rsf} \frac{R_u}{R_T} + (1 - \Pi(z = DL)) \rho_{Tx}^{UE} R_U N_{rsf}$$

Equation 1

The four components (terms) of the above energy per request of the service category metric (KPI) includes:
1. Central Cloud (computation+switches+optical)
2. Edge Cloud (computation+optical+mmWave)
3. Remote Unit (RF analog component+number of radio sub-frames (RSF) related+mmWave)
4. UE (RF analog+number of RSF)

TABLE 1

| Symbol | Description |
| --- | --- |
| $S_u$ | Split option allocated to request of the service category. |
| $M_u$ | Modulation index assigned to request of the service category. |
| $R_u$ | Resource block allocated to request of the service category. |
| $E_{lc}, E_{es}, E_{onu}, E_{osw}$ | Energy density of line card (LC), ethernet switch (ES), optical network unit (ONU), optical switch (OSW) (joule per bit). |
| $V_{S_u}$ | Volume of bits per request of the service category and split $S_u$ [1]. |
| $V_{S_u-9}$ | Volume of bits per request of the service category when $S_u = 9$ [2]. |
| $E_{du}^{cc}$ | Energy density of DU at central cloud (CC). |
| $C_u^{cc,z}$ or $C_u^{ec,z}$ | Processing complexity at CC or edge cloud (EC) for downlink (DL) or uplink (UL) of request of the service category. |
| $Ef_{cc}, EF_{ec}, Ef_{ru}$ | Efficiency of equipment at CC, EC, and RU. |
| $\eta_{prc}^{ec}$ | Processing efficiency of processors at EC [3]. |
| $\eta_{pw}^{ec}$ | Power efficiency of processors in EC. |
| $E_{mWT}$ and $E_{mWR}$ | Energy density of mmWave transmitter and receiver [4]. |
| $P_{Ang}$ | Power consumption of analogue devices at RU. |
| $P_{Ang}^{(UE)}$ | Power consumption of analogue devices at the UE. |
| $\rho_{Tx}^{UE}$ | Energy density per PRB of radio transmission, which is different than the static energy of the radio transmission. |
| $N_{rsf}$ | Number of RSFs needed to deliver the request of the service category. |
| $T_{rsf}, T_{of}$ | Time of a radio sub-frame and optical frame. |
| $R_T$ | Total bandwidth that is used by all services in RU. |
| $\rho_{Tx}$ | Energy density of radio transmission per a resource block. |
| $C_{Eq}^{cc}$ | Equipment processing capability at CC. |
| $X_{ec}, X_{cc}$ | Scaling factor that shows the amount of extra vCPUs. |
| $D_T$ | End to end delay from CC to user. |
| $D_{prc}$ | Delay of communication processing. |
| $D_{N_{rsf}}, D_{N_{of}}$ | Delay of radio sub-frames, optical frames. |
| $D_{cnst}$ | Constant delay induced from several equipments. |
| $N_{sc_{rb}}$ | Number of sub-carriers in a resource block. |
| $N_{sym_{sf}}$ | Number of symbols in a radio sub-frame. |
| $V_s$ | Requested content (not only per radio sub-frame) volume (in bits). |
| $V_s(S_u, R_u, M_u)$ | Data volume needed to be transferred from CC to EC. (As a result of the selected split Su it is per radio subframe.) |
| $C_{rsf}^{cc,z}(S_u, R_u, M_u)$ | Amount of processing complexity needed per radio subframe at the CC. |
| $C_{rsf}^{ec,z}(S_u, R_u, M_u)$ | Amount of processing complexity needed per radio subframe at the EC. |
| $O_{prb}$ | Overhead introduced by communication protocol. |
| $S_{of}(|\mathbb{C}|)$ | Amount of bits that can be accommodated by the optical frame divided by $|\mathbb{C}|$, i.e. number of cells which share the optical link assuming the usage of TWDM-PON. |

[1] $V_{S_u}$ is a function of $S_u$, $M_u$ and $R_u$.
[2] $V_{S_u-9}$ is a function of $M_u$ and $R_u$.
[3] $\eta_{prc}^{ec}$ is the processing efficiency of the EC's processors to those in CC.
[4] $E_{mWT}$ and $E_{mWR}$ include static and dynamic parts.

Furthermore, the Equation 2 provides a metric for the user plane latency per request of the service category.

$$D_T(Z) = D_{prc,z}(S_u, R_u, M_u) + D_{N_{rsf}}(R_u, M_u) + D_{N_{of}}(S_u, R_u, M_u) + D_{cnst} \quad \text{Equation 2}$$

The four components (terms) breakdown of the above user plane latency per request of the services category metric (KPI) includes:

1. Accumulative user plane latency for the service category induced via processing and is a function of processing location ($S_e$) (which decide number of vCPUs needed at each location), PRB ($R_u$), and modulation index ($M_u$), etc.
2. Accumulative user plane latency for the service category induce via number of RSF per services and is a function of $R_u$ and $M_u$, etc.
3. Accumulative user plane latency for the service category induce via optical fibre frames, and is a function of $S_u$ (which decide number of vCPUs needed at each location), $R_u$, and $M_u$.
4. Constant user plane latency induced via switches, optical switches, mmWave point-2-point communication, etc.

Expressed in detail, term 1 of equation 2 is:

$$D_{prc,z}(S_u, R_u, M_u) = \frac{N_{rsf} C_{rsf}^{cc,z}(S_u, R_u, M_u)}{C_{Eq}^{cc} X_{cc}} + \frac{N_{rsf} C_{rsf}^{ec,z}(S_u, R_u, M_u)}{C_{Eq}^{cc} \eta_{prc}^{ec} X_{cc}}$$

Where the numerator of the first term is a needed processing at central cloud 132 per request of the service category, the denominator of the first term is the central cloud's 132 equipment capability times the number of vCPUs, the numerator of the second term is a needed processing at edge cloud 122 per request of the service category, and the denominator of the second term is the edge clouds 122 equipment capability times number of vCPUs.

Expressed in detail, term 2 of equation 2 is:

$$D_{N_{rsf}}(R_u, M_u) = \left\lceil \frac{V_s}{N_{sc_{rb}} N_{sym_{sf}} R_u (1 - 0_{prb}) M_u} \right\rceil T_{rsf}$$

Where the numerator of the first factor is a content size, the denominator of the first factor is the size of data that can be accommodated by one radio subframe, and the second factor a radio subframe duration.

Expressed in detail, term 3 of equation 2 is:

$$D_{N_{of}}(S_u, R_u, M_u) = \left\lceil \frac{V_{S_u}(S_u, R_u, M_u) N_{rsf}}{S_{of}(|\mathbb{C}|)} \right\rceil T_{of}$$

Where the numerator of the first factor is a size of an optical frame for all radio subframes, the denominator of the first factor is the size of the optical frame, and the second factor an optical frame duration.

List of parameters that can be inferred from the exampled proposed model:
1. Number of vCPUs
2. Radio Modulation Index
3. Number of Physical Resource Block Further parameters can be inferred, described below:
4. Optical Technology (in-term of optical frame size and duration)
5. Radio technology, in terms of radio subframe (or mini-slot) size and duration.
6. Processing Equipment Capability (at central cloud 132 and edge cloud 122).
7. Power and processing efficiencies between central cloud 132 and edge cloud 122 and UE 142.
8. Transmission power (hence amplifier type)
9. Switches and transport layer speed For example degraded delay by reducing $M_u$, where 1 correspond to BPSK and 9 corresponds to $2^9$QAM, in a cell layer can be compensated for via changing communication function processing allocation in the central cloud 132 of the central cloud layer 130 and edge cloud 122 of the edge cloud layer 120. One of the cloud parameters is $S_u$, which is equal to 1 when all processing functions are allocated at the central cloud 132 of the central cloud layer 130 and equal to 9 when all functions are allocated in the edge cloud 122 of the edge cloud layer 120. For example, say that the network has to reduce $M_u$, from 6 to 4 in a next time interval, to ensure certain reliability, e.g. based on a predicted network state in the next time interval, this may degrade the latency about 20 to 30 msec. Then, changing $S_u$ from $S_u=9$ to $S_u=1$ in the next time interval, could compensate majority of this extra latency. This is an example of an adapted allocation of resources in a plurality of network layers which at least partly compensates for a predicted performance degradation in a next time interval in relation to the at least one network layer of the plurality of network layers.

Once a predicted number of requests for a service type has been determined a network slice instance should be created with optimal configurations in relation to allocation of resources in each layer of the plurality of network layers 110, 120, 130. This is achieved in two steps. The first step is to define what an optimal configuration is given the predicted number of requests for the service type has been determined. The second step is to enforce this configuration by sending messages to the different network and infrastructure as a service (IAAS) components.

For simplicity we will describe how to define the optimal number of vCPUs in the central cloud 132 and in the edge cloud 122 which is only one part of the configuration. However, the approach we used can be extended to define other parameters (such as modulation index, physical resource blocks, and transmission power, etc.).

For each service type we assume that we already know the expected delay.

In the following, we link the central cloud 132 capacity (which is fixed) to the predicted number of services requests for the service type and the number of required vCPUs to meet quality of service requirements.

Capacity_Cloud≥number_of_requests_for_service_type*number_of_vCPU_at_central+number_of_requests_for_service_type*number_of_vCPU_at_edge Using a linear equation solver such as sage (sagemath.org) we can produce different sets of values, for number of vCPUs at both edge cloud 122 of the edge cloud layer 120 and central cloud 132 of the central cloud layer 130, which satisfy this condition.

Figure 3:
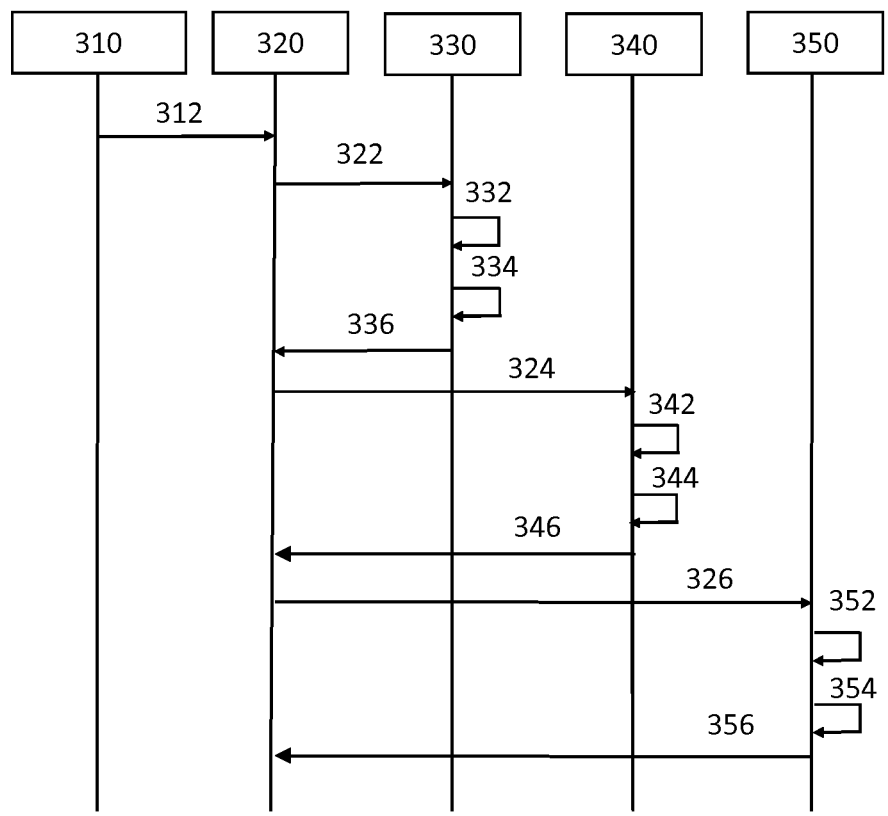
FIG. 3 is a signalling diagram illustrating an exchange of signals in relation to embodiments of a control unit.

Once the expected number of vCPUs is computed for the central cloud 132 and the edge cloud 122, we can include them into the network slice instance which is a collection of all desired values expected from each network element to have. These parameters are provided from an operator 310 as input to a createNetworkSlice( ) function 312 for creation of a network slice instance as illustrated in the sequence diagram in FIG. 3. They will be communicated by way of a network slice management function (NSMF) node 320 (such as a network node 500 illustrated in FIG. 5) to the corresponding orchestrators in a cascading fashion at each layer 110, 120, 130, starting from the TransportLayerOrchestrator 330 to the RANOrchestrator 340 and then to the CloudOrchestrator 350. For each orchestrator, a comparison will be made between expected parameter current value and desired parameter value and based on the delta a change will be enforced. For example, if the desired number of vCPUs for service type critical machine type communication (cMTC) is 5 and the current value is 8 the delta will be 3 therefore the Cloud Orchestrator will push for a reduction in the number of vCPUs.

A request for the purposes of creating a network slice instance is pushed from the operator 310 to the NSMF node 320 which would then classify which services (such as video, augmented reality, virtual reality, audio, VoIP, email, synching, message, data storage etc.) are needed based on the given request and then predict (e.g. a number of requests of a service category) and materialize the prediction by performing resource allocation using different orchestrators 330, 340, 350 in the Transport Layer, Radio Access Network Layer and also in the Cloud layer. Deltas between allocations can exist and as such are moved on to a different orchestrator to compensate for the absence of resources. A wantedState indication 322 indicating a wanted state is sent from the NSMF node 320 to the TransportLayerOrchestrator 330. The wanted state is checked in a check(wantedState) function 332 and available resources are allocated in an allocateResources( ) function 334. If all wanted resources are not available and cannot be allocated, the available resources are allocated and the difference between the wanted resources and the allocated resources are indicated as a delta1 value 336 from the TransportLayerOrchestrator 330 to the NSMF node 320. A wantedState+delta1 indication 324 indicating a wanted state including also the difference between the wanted resources and the available allocated resources from the TransportLayerOrchestrator 320, i.e. the delta1 value 336, is sent from the NSMF node 320 to the RANOrchestrator 340. The wanted state is checked in a check(wantedState+delta1) function 342 and available resources are allocated in an allocateResources( ) function 344. The difference between the wanted resources and the available allocated resources are indicated as a delta1 value 346 from the RANOrchestrator 340 to the NSMF node 320. A wantedState+delta2 indication 326 indicating a wanted state including also the difference between the wanted resources and the available allocated resources from the RANOrchestrator 340, i.e. the delta1 value 346, is sent from the NSMF node 320 to the CloudOrchestrator 350. The wanted state is checked in a check(wantedState+delta2) function 352 and available resources are allocated in an allocateResources( ) function 354. The difference between the wanted resources and the available allocated resources are indicated as a delta3 value 356 from the CloudOrchestrator 330 to the NSMF node 320.

FIG. 4 is a block diagram illustrating embodiments of a control unit 400 which may incorporate at least some of the example embodiments discussed above. As shown in FIG. 4, the control unit 400 may comprise processing circuitry 410. The processing circuitry 410 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

The control unit 400 may further comprise at least one memory unit or circuitry 420 that may be in communication with the processing circuitry 410. The memory 420 may be configured to store executable program instructions 430. The memory 420 may be any suitable type of computer readable memory and may be of volatile and/or non-volatile type.

FIG. 4 is a block diagram illustrating embodiments of a control unit 400 for configuration in a wireless communication system. The communication system has a network architecture including a layered structure, for example according to the layered structured illustrated in FIG. 1. Virtual network instances, for example in the form of network slice instances, are created, configured, re-configured and terminated using a virtual network management function, such as a network slice management function, in relation to a network state. For example, the network state may indicate a number of requests for a service category and the service category may be mapped to a virtual network instance.

In an embodiment of the control unit illustrated in FIG. 4 the memory 420 contains instructions 430 executable by the processing circuitry 410, whereby the embodiment of the control unit 400 is operative to perform embodiments of the method illustrated in FIG. 2 and described hereinabove.

FIG. 5 is a block diagram illustrating embodiments of a network node 500 for configuration in a wireless communication system. The network node 500 comprises an embodiment of a control unit 400 illustrated in FIG. 4.

In an embodiment of the network node illustrated in FIG. 5, the network node comprises a control unit 400. The control unit 400 comprises processing circuitry 410 and memory 420 which contains instructions 430 executable by the processing circuitry 410, whereby the control unit 400 is operative to perform embodiments of the method illustrated in FIG. 2 and described hereinabove.

It is to be noted that the control unit 400 in the embodiments of the network node 500 illustrated in FIG. 5 need not be an included separate hardware unit. The control unit 400 may be a logical unit of the network node 500, which may be implemented in software, where the processing circuitry 410, the memory 420 and the instructions 430 are comprised in the control unit 400 in a logical sense.

Embodiments may be implemented in a computer program, comprising instructions 430 which, when executed by processing circuitry 410, cause the processing circuitry 410 to perform the method of the disclosure.

Embodiments may be implemented in a computer program product 420 having stored thereon a computer program comprising instructions 430 which, when executed by processing circuitry 410, cause the processing circuitry 410 to perform the method of the disclosure.

The embodiments disclosed and illustrated in relation to the drawings, have generally been described in relation to one service category and a limited number of parameters and types of performance degradation. It will be apparent that the embodiments may be extended to several service categories and a variety of parameters and types of performance degradation.

It should be appreciated that FIG. 1 comprises some operations which are illustrated comprised in solid line boxes and some operations which are illustrated comprised in dashed line boxes. The operations which are comprised in solid line boxes are operations which are comprised in the broadest example embodiment. The operations which are comprised in dashed line boxes are example embodiments which may be comprised in, or a part of, or are further operations which may be taken in addition to the operations of the broader example embodiment. It should be appreciated that these operations need not be performed in any specific order unless otherwise specified. Furthermore, it should be appreciated that not all of the operations need to be performed. The example operations may be performed in any order and in any combination unless otherwise specified.

It should be appreciated that the example operations of FIG. 1 may be performed simultaneously for any number of services or service categories in the wireless communications network.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP 5G has been used herein to explain the example embodiments, this should not be seen as limiting the scope of the example embodiments to only the aforementioned system. Other wireless systems, including LTE, WCDMA, WiMax, UMB and GSM, may also benefit from the example embodiments disclosed herein.

Also note that to the extent that terminology such as gNB and UE have been used, this should be considered as non-limiting and does in particular not imply a certain hierarchical relation between the two. In general "gNB" could be considered as device 1 and "UE" as device 2, and these two devices communicate with each other over some radio channel. Furthermore, while the example embodiments focus on wireless transmissions in the downlink, it should be appreciated that the example embodiments are equally applicable in the uplink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "UE" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a UE, as measuring or recording unit, it should be understood by the skilled in the art that "UE" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or gNB used interchangeably in the example embodiment description, comprises in a general sense any node transmitting radio signals used for measurements, e.g., gNB, eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A control unit for configuration in a wireless communication system, comprising processing circuitry, and a memory, said memory containing instructions executable by said processing circuitry, whereby said control unit is operative to:
   map a service category to a virtual network instance based on service requirements of the service category, the virtual network instance having a first virtual network instance configuration for a current time interval, the first virtual network instance configuration defining a first allocation of resources in a plurality of network layers;
   predict a network state in a next time interval, wherein to predict the network state comprises to predict a number of requests of the service category in the next time interval;
   determine if the predicted network state in the next time interval results in a predicted performance degradation in the next time interval in relation to at least one network layer of the plurality of network layers;
   on condition that there is a predicted performance degradation in the next time interval in relation to at least one network layer of the plurality of network layers, determine a second virtual network instance configuration for the next time interval, the second virtual network instance configuration defining an adapted second allocation of resources in the plurality of network layers at least partly compensating for the predicted performance degradation in the next time interval in relation to the at least one network layer of the plurality of network layers; and
   configure the virtual network instance based on the first network instance configuration or the second network instance configuration for the next time interval.

2. The control unit of claim 1, wherein configure the virtual network instance comprises:
   on condition that there is a predicted performance degradation in the next time interval in relation to at least one network layer of the plurality of network layers, configure the virtual network instance based on the second network instance configuration for the next time interval.

3. The control unit of claim 2, wherein configure the virtual network instance comprises:
   on condition that there is no predicted performance degradation in the next time interval of in relation to at least one network layer of the plurality of network layers, maintain the first network instance configuration for the virtual network instance for the next time interval.

4. The control unit of claim 1, wherein predict a network state comprises:
   predict a channel condition in the next time interval.

5. The control unit of claim 1, wherein the virtual network instance, is a network slice instance, NSI.

6. The control unit of claim 1, wherein the plurality of network layers comprises a radio layer, cloud layers, and transport layers.

7. The control unit of claim 1, further operative to predict a network state in a next time interval using a machine learning, ML, algorithm.

8. The control unit of claim 1, wherein the predicted performance degradation is in relation to a performance indicator of the service category.

9. The control unit of claim 1, wherein the predicted performance degradation is in relation to one of peak data rate, average data rate, peak spectral efficiency, average spectral efficiency, control plane latency, user plane latency, interrupt at handover, reliability, connection density, mobility, maximum number of digital units needed for a request of the service category, transport layer consumed capacity per request of the service category, and energy of a request of the service category.

10. The control unit of claim 1, further operative to:
    determine an actual network state in the next time interval;
    compare the determined actual network state in the next time interval and the predicted network state for the next time interval; and
    on condition that the actual network state in the next time interval differs from the predicted network state in the next time interval, compensate for prediction errors.

11. The control unit of claim 1, wherein determine a second virtual network instance configuration comprises:
    allocate, based on the predicted performance degradation in relation to the at least one network layer of the plurality of network layers, additional resources in a different network layer of the plurality of network layers than the at least one network layer of the plurality of network layers, at least partly compensating for the predicted performance degradation in the next time interval in the at least one network layer of the plurality of network layers.

12. A network node for configuration in a wireless communication system, comprising a control unit of claim 1.

13. A method in a control unit for configuration in a wireless communication system, comprising:
    mapping a service category to a virtual network instance based on service requirements of the service category, the virtual network instance having a first virtual network instance configuration for a current time interval, the first virtual network instance configuration defining a first allocation of resources in a plurality of network layers;
    predicting a network state in a next time interval, wherein predicting the network state comprises predicting a number of requests of the service category in the next time interval;
    determining if the predicted network state in the next time interval results in a predicted performance degradation in the next time interval in relation to at least one network layer of the plurality of network layers;

on condition that there is a predicted performance degradation in the next time interval in relation to at least one network layer of the plurality of network layers, determining a second virtual network instance configuration for the next time interval, the second virtual network instance configuration defining an adapted second allocation of resources in the plurality of network layers at least partly compensating for the predicted performance degradation in the next time interval in relation to the at least one network layer of the plurality of network layers; and configuring the virtual network instance based on the first network instance configuration or the second network instance configuration for the next time interval.

14. The method of claim 13, wherein configuring comprises:

on condition that there is a predicted performance degradation in the next time interval in relation to at least one network layer of the plurality of network layers, configuring the virtual network instance based on the second network instance configuration for the next time interval.

15. The method of claim 14, wherein configuring further comprises:

on condition that there is no predicted performance degradation in the next time interval in relation to at least one network layer of the plurality of network layers, maintaining the first network instance configuration for the virtual network instance for the next time interval.

16. The method of claim 13, wherein predicting a network state comprises predicting a channel condition in the next time interval.

17. The method of claim 13, wherein the virtual network instance, is a network slice instance, NSI.

18. The method of claim 13, wherein predicting a network state is performed using a machine learning, ML, algorithm.

\* \* \* \* \*